United States Patent
Michaelis et al.

(10) Patent No.: US 7,203,602 B2
(45) Date of Patent: Apr. 10, 2007

(54) METHOD FOR OPERATING A ROLLER TEST BENCH AND ROLLER TEST BENCH

(75) Inventors: Gerd Michaelis, Moehrendorf (DE); Martin Pichler, Koestendorf (AT)

(73) Assignee: Siemens Aktiengesellschaft, Munich (DE)

( * ) Notice: Subject to any disclaimer, the term of this patent is extended or adjusted under 35 U.S.C. 154(b) by 19 days.

(21) Appl. No.: 10/768,659

(22) Filed: Feb. 2, 2004

(65) Prior Publication Data
US 2004/0220755 A1 Nov. 4, 2004

(30) Foreign Application Priority Data
Mar. 3, 2003 (DE) ................ 103 09 247

(51) Int. Cl.
*G01L 1/00* (2006.01)
(52) U.S. Cl. .............. 702/41; 73/117; 73/123; 73/126
(58) Field of Classification Search ............ 73/117, 73/123, 126; 702/41
See application file for complete search history.

(56) References Cited

U.S. PATENT DOCUMENTS 6,457,352 B1 * 10/2002 Knestel ............... 73/117

2004/0050150 A1 3/2004 Jahn et al.

FOREIGN PATENT DOCUMENTS

| DE | 39 20 277 C2 | 1/1991 |
|----|----|----|
| DE | 691 16 143 T2 | 1/1993 |
| DE | 299 20 168 U1 | 4/2000 |
| DE | 199 00 620 A1 | 7/2000 |
| DE | 101 20 294 A1 | 10/2002 |
| DE | 102 07 110 A1 | 8/2003 |
| EP | 0246345 A1 | 11/1987 |
| GB | 1 460 465 A | 1/1977 |
| WO | WO 02/055979 A1 | 7/2002 |

* cited by examiner

*Primary Examiner*—Michael Nghiem
*Assistant Examiner*—Stephen J. Cherry
(74) *Attorney, Agent, or Firm*—Sughrue Mion, PLLC

(57) ABSTRACT

A method and an apparatus for operating a test bench, e.g. a roller test bench, for carrying out simulation drives of a vehicle placed on the test bench. At least one vehicle wheel contacts at least one roller of the roller test bench. To determine the roller setpoint speed, a reaction torque of the roller in relation to the vehicle wheel is measured on the roller of the roller test bench.

13 Claims, 1 Drawing Sheet

METHOD FOR OPERATING A ROLLER TEST BENCH AND ROLLER TEST BENCH

The following disclosure is based on German Patent Application No. 10309247.1, filed on Mar. 3, 2003, which is incorporated into this application by reference.

FIELD OF AND BACKGROUND OF THE INVENTION

The invention relates to a method for operating a test bench to carry out simulation drives of a vehicle placed on the test bench. The invention further relates to a test bench configured, e.g., to carry out this method.

Test benches for driving simulation are known in the art in several variants (e.g. roller test benches, conveyor belts). Roller test benches are configured as a counterpart to a tire, and are fashioned as one or as a plurality of rotatable rollers or cylinders (single rollers, double rollers). These rollers receive the tire and follow a motion imparted to the tire or produce such a motion. Likewise, conveyor belts or running, closed belts stretched across two or more rotatable cylinders are configured as a counterpart to a tire. These belts receive the tire and follow an imparted motion or produce a motion. As used in the present application, the term 'roller' and the like encompass rollers, cylinders, belts, etc.

In a first drive modus, in particular, a plurality of drives are mechanically intercoupled with belts using rollers. During acceleration or deceleration, the individual drives are mechanically interlinked via couplings. If the system is accelerated by means of a vehicle, the speed change depends on the magnitude of the forces on the surface of the wheels and on the mechanically installed mass or the moments of inertia of all the mechanical parts that are to be set in motion.

In another drive modus, a unit (i.e., a drive train that can receive a wheel) is driven by an electric motor. If there are several respective units, there is no mechanical link between the units, except in service operating modes. One unit or two units (1 axle) is/are designated as the master. It is possible to control the master drive to a constant torque (positive or negative for load relief or loading), but the drive is not speed-controlled. The actual speed of the master drive is measured and provided as a setpoint value to the slave drives, if any. Under these conditions, it is possible that the rpm's and the speeds of the four sets of rollers differ from one another, because there is no mechanical link between the individual rollers and drives.

OBJECTS OF THE INVENTION

One object of the invention is to provide a method for operating a test bench, e.g. a roller test bench, that offers particularly realistic insights into the response behavior of a motor vehicle. A further object of the invention is to provide a test bench to be used with such a method.

SUMMARY OF THE INVENTION

According to one formulation of the invention, these and other objects are attained by a method for operating a test bench to carry out simulation drives of a vehicle placed on the test bench, which method includes: contacting at least one wheel of the vehicle to at least one roller of the test bench; measuring a reaction torque of the roller in relation to the vehicle wheel on the roller of the test bench; and determining a setpoint speed of the roller from the measured reaction torque. According to a further formulation, the invention is directed to a test bench that includes at least one roller configured to indirectly or directly contact at least one wheel of a vehicle; means for measuring a reaction torque of the roller in relation to the vehicle wheel; and means for determining a setpoint speed of the roller from the measured reaction torque.

For instance, in a method according to the invention for operating a roller test bench to carry out driving simulations, an associated roller reaction torque in relation to the wheels of the vehicle (e.g., an automobile or a motor cycle) is measured on at least one of the rollers of the roller test bench. This reaction torque, which is determined preferably taking into account the inevitable losses, in the form of friction or acceleration, for the test bench itself, is converted into a reaction force using the radius of the corresponding roller (reaction force F=reaction torque M/radius r). This determines a reaction force for the roller of the roller test bench. This determination of a reaction force and the other embodiments of the described method can be used analogously for test benches equipped with conveyor belts.

The reaction forces of all the rollers can now be added to obtain a total roller reaction force. The individual reaction force, or the total reaction force obtained from the individual reaction forces added together, and the vehicle mass m are then used to determine the acceleration to which the vehicle would be exposed in actual on-road traffic (acceleration a=reaction force F/vehicle mass m).

The setpoint speed is now corrected, e.g. in a feedback control circuit, using the determined acceleration, and the individually driven rollers are correspondingly accelerated or decelerated until the setpoint speed is reached or until the reaction forces no longer prompt any acceleration or deceleration.

Once the reaction torques and thus also the reaction forces are available and determined, the determined setpoint speed can now be continuously brought near the actual speed by accelerating or decelerating the individual rollers. This is accomplished by a feedback control circuit, which is known per se.

With the method according to the invention, other forces (e.g., gradient resistance, drag) aside from the reaction forces occurring on the individual rollers can be included when the reaction forces are added. An increased or correspondingly decreased acceleration is thereby determined, such that an increased or decreased setpoint speed is determined. As a result the simulation is made more realistic.

Preferably, the precise vehicle mass m is taken into account when the setpoint speed is determined.

BRIEF DESCRIPTION OF THE DRAWINGS

The invention will now be described in greater detail with reference to a switching example for controlling the roller test bench depicted in the single drawing Figure.

DETAILED DESCRIPTION OF THE PREFERRED EMBODIMENTS

Figure 1:
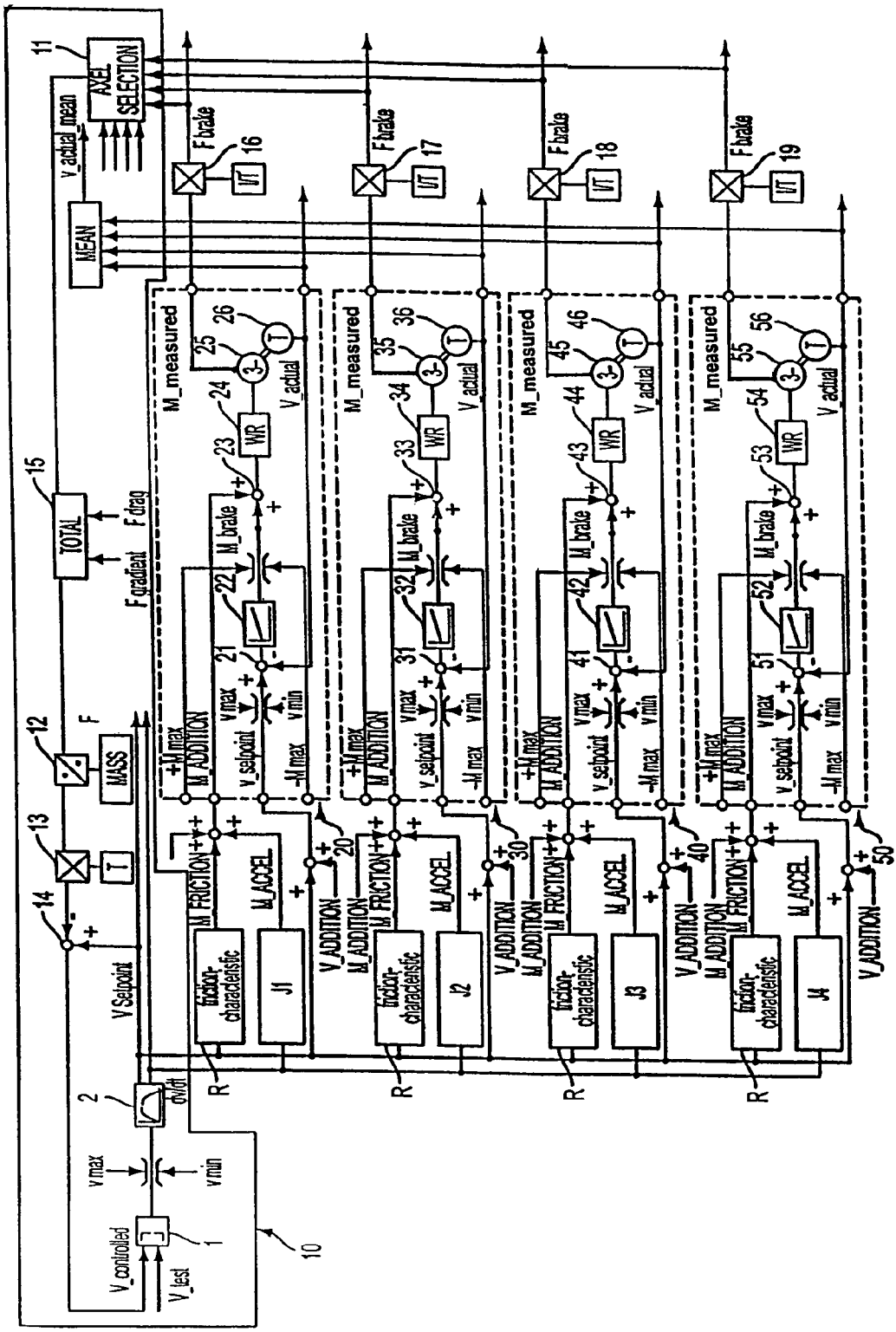

The control system illustrated by way of example consists of four secondary control loops 20, 30, 40, 50 (for 4 rollers for a motor vehicle with 4 wheels), which are respectively used to control the speed of each individual roller 26, 36, 46, 56. Superimposed thereon is a control loop 10 that enables self-controlled operation, such that acceleration (stepping on the gas) or deceleration (braking) of the vehicle causes the roller speed to be adjusted.

The four secondary control loops 20, 30, 40 50 are identified in the drawing figure by dash-dotted lines. The function is best described as follows, with the explanations starting at v_setpoint of secondary control loop 20 (the description of the other secondary control loops is similar):

1. The setpoint speed v_setpoint is constrained to stay between the maximum speed v_max and the minimum speed v_min. Typical values could be, for example 200 km/h and 30 km/h (or e.g. 125 mph and 20 mph).
2. The setpoint value is compared with the actual value—v_actual—and the difference is formed in adder 21.
3. The controller 22 calculates a suitable torque M_brake to which M_addition is added in adder 23. M_addition compensates the acceleration—M_ACCEL.—of the roller 26 and the friction—M_FRICTION—in the test bench. Initially, these are still digital computational values, not physical quantities.
4. The torque for all quadrants is limited to its maximum value, defined by the performance data of the converters and the motors, or by the given technology.
5. The resulting value is fed as a specified value to the converter 24 that supplies the motor 25. The motor 25 very accurately produces an actual, physically measurable torque —M_measured—. This torque can be made reproducible by calibration enabling feedback to a works standard.
6. The roller 26, with its own moment of inertia and the vehicle as a load, responds to the torque. The resulting speed (actual value) is measured—as v_actual—.

The depicted superimposed control loop 10 (above the dash-dotted lines) is active only in the self-controlled mode—v_controlled—(also: disconnected mode with switch position to v_test), which will be described in greater detail below. The v_controlled—mode is activated by the switch 1, which toggles between v_controlled and v_test.

In the position shown, the—v_controlled—mode is active. As a result, the torques of all rollers are added in adder 11 and the acceleration that the vehicle would experience under road conditions is simulated. The speed v_setpoint is then corrected by acceleration means 2 and is fed to the secondary control loops 20, 30, 40, 50 (within the dash-dotted lines). In detail, the system goes through the following steps:

1. The one or more vehicle tires attempt to change the absolute rotational speed because of an external influence J1, J2, J3, J4 (actuation of the gas pedal or the brake).
2. On the surface of the counterpart to the tire, a force is transmitted, and the speed controller 22, 32, 42, 52 subsequently detects a deviation between the setpoint and the actual value.
3. The speed controller 22, 32, 42, 52 tries to counteract this deviation (responds with a torque) and provides a correcting variable in the form of a torque (the sign—positive or negative—is a function of the sign of the deviation between the setpoint and the actual value).
4. The measured torque—M_measured—is converted into a force using constant factors (in the specific case of the roller test bench using the radius of the rollers).
5. The axles to be taken into account are selected. Normally, these are all the axles.
6. The forces of all the axles are calculated by multipliers 16, 17, 18, 19 for each roller 26, 36, 46, 56, respectively, and are added in adder 11.
7. The total force F that accelerates or decelerates the vehicle is divided by the vehicle mass m in divider 12. The result is the acceleration that the vehicle would experience on the road if it were exposed to the calculated total force.
8. Multiplication with the sampling time T in multiplier 13 of the control loop gives the speed increment, i.e., within the sampling time, the speed of the vehicle on the road would change by this amount.
9. The speed increment is added to the current setpoint speed in adder 14.
10. The new setpoint speed is used in the next sampling step. The secondary control loops are used to attempt to reach this new setpoint speed on all four rollers 26, 26, 46, 56.

The superimposed control loop 10 (above the dash-dotted lines) can be disconnected. For this purpose, the switch 1 is switched from the—v_controlled—position (as shown) to the v_test position.

In the disconnected mode—_test—, the speed of the four rollers 26, 36, 46, 56 is controlled according to the setpoint speed. A higher-level computer specifies a driving cycle with changing setpoint speeds. There is no feedback of the brake or acceleration forces to the setpoint speed. Operation in the disconnected mode is intended for tests that are known per se, namely the static brake test, the brake test at different speeds and the ABS test.

The following tests can be conducted using the disconnected mode:

1. Starting from a Dead Stop (with Front Wheel Drive)

A vehicle with front wheel drive is located on the test bench. The driver puts the vehicle in first gear, engages the clutch and steps on the gas. This causes an accelerating torque to be applied to the front wheels. The setpoint speed is initially 0; the actual speed increases. The front electric motors build up a torque to maintain the setpoint speed 0. Within a sampling period the torque on the two front rollers is converted into the drive force with which the vehicle would be accelerated on the road. The ensuing acceleration is calculated and the setpoint speed is increased accordingly. The acceleration that the vehicle would experience under the same conditions on the road ensues.

2. Braking from an Average Speed (with Rear Wheel Drive)

A vehicle with rear wheel drive is located on the test bench. The speed is 50 km/h; the driver has disengaged the clutch. When the driver actuates the brake, the actual speed initially decreases. The electric motors must apply an accelerating torque to the rollers to reach the setpoint speed again. In parallel therewith the braking forces of all four wheels are added. The sum of the four forces is used to calculate the deceleration that the vehicle would experience on the road. The setpoint speed is correspondingly reduced and approaches the actual speed. Thus, the control keeps the difference between the setpoint speed and the actual speed small by adjusting the setpoint speed to the actual speed through feedback. The deceleration that the vehicle would actually experience on the road is thereby simulated.

3. Simulation of Uphill Travel

Uphill travel is simulated in that, in corrected operation, the force parallel to the inclined plane Ft is deducted from the drive force of the vehicle. At a constant speed on a flat road the engine does not need to apply an accelerating torque, assuming that one initially neglects rolling friction and drag. Once uphill travel starts, a positive force is added in the superimposed control loop such that the total drive force applied to the vehicle is negative from a physical perspective. As a result, a negative acceleration occurs, the setpoint speed is reduced, and the vehicle slows down. To maintain the speed, the driver must step on the gas. If he does not do that, the vehicle slows down as a function of the gradient.

The above examples are illustrative of the possibilities of a realistic simulation using the described method for operating a roller test bench.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for operating a test bench to carry out simulation drives of a vehicle placed on the test bench, comprising:

contacting at least one wheel of the vehicle to at least one roller of the test bench;

measuring a reaction torque of the roller in relation to the vehicle wheel on the roller of the test bench;

determining a setpoint speed of the roller from the measured reaction torque;

comparing the setpoint speed to an actual speed of the roller; and controlling the roller based on a result of the comparison, wherein the comparison between the setpoint speed and the actual speed is independent of actual speeds of other rollers on the test bench.

2. The method according to claim 1, wherein the test bench is a roller test bench.

3. The method as claimed in claim 1, further comprising calculating a reaction force from the measured reaction torque and a radius of the roller.

4. The method as claimed in claim 3, further comprising:

calculating at least one additional reaction force for at least one additional roller; and adding the additional reaction force to the calculated reaction force.

5. The method as claimed in claim 3, wherein at least one additional force is added to the calculated reaction force.

6. The method as claimed in claim 5, wherein the additional force comprises a gradient resistance.

7. The method as claimed in claim 5, wherein the additional force comprises a drag force.

8. The method as claimed in claim 3, further comprising calculating a further value from the reaction force and a mass value m for the vehicle.

9. A method for operating a test bench to carry out simulation drives of a vehicle placed on the test bench, comprising:

contacting at least one wheel of the vehicle to at least one roller of the test bench;

measuring a reaction torque of the roller in relation to the vehicle wheel on the roller of the test bench;

determining a setpoint speed of the roller from the measured reaction torque;

calculating a reaction force from the reaction torque and a radius of the roller;

calculating a setpoint acceleration a of the roller from the reaction force F and a mass value m for the vehicle using the formula a=F/m; and using the setpoint speed and the setpoint acceleration in controlling the roller.

10. A test bench, comprising:

at least one roller configured to indirectly or directly contact at least one wheel of a vehicle;

means for measuring a reaction torque of the roller in relation to the vehicle wheel;

means for determining a setpoint speed of the roller from the measured reaction torque;

means for comparing the setpoint speed to an actual speed of the roller; and means for controlling the roller based on a result of the comparison, wherein the comparison between the setpoint speed and the actual speed is independent of actual speeds of other rollers on the test bench.

11. The test bench as claimed in claim 10, wherein the test bench is a roller test bench.

12. A test bench, comprising:

at least one roller configured to indirectly or directly contact at least one wheel of a vehicle;

a measuring circuit that measures a reaction torque of the roller in relation to the vehicle wheel;

a setpoint circuit that determines a setpoint speed of the roller from the measured reaction torque;

a comparator that compares the setpoint speed to an actual speed of the roller; and a controller that controls the roller based on an output from the comparator, wherein the comparison between the setpoint speed and the actual speed is independent of actual speeds of other rollers on the test bench.

13. The test bench as claimed in claim 12, wherein the test bench is a roller test bench.

* * * * *